US012683896B2

(12) United States Patent
Kolar et al.

(10) Patent No.: US 12,683,896 B2
(45) Date of Patent: Jul. 14, 2026

(54) PREDICTIVE APPLICATION-AWARE LOAD-BALANCING BASED ON FAILURE UNCERTAINTY

(71) Applicant: Cisco Technology, Inc., San Jose, CA (US)

(72) Inventors: Vinay Kumar Kolar, San Jose, CA (US); Jean-Philippe Vasseur, Saint Martin d'Uriage (FR); Mukund Yelahanka Raghuprasad, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 456 days.

(21) Appl. No.: 17/712,412

(22) Filed: Apr. 4, 2022

(65) Prior Publication Data

US 2023/0318977 A1     Oct. 5, 2023

(51) Int. Cl.
*H04L 47/125*     (2022.01)
*H04L 41/5019*     (2022.01)
*H04L 47/11*     (2022.01)

(52) U.S. Cl.
CPC ........ *H04L 47/125* (2013.01); *H04L 41/5019* (2013.01); *H04L 47/11* (2013.01)

(58) Field of Classification Search
CPC ... H04L 47/125; H04L 41/5019; H04L 47/11; H04L 43/0829; H04L 43/0852; H04L 43/0888; H04L 41/147; H04L 41/40; H04L 43/08
See application file for complete search history.

(56) References Cited

U.S. PATENT DOCUMENTS

| | | | |
|---|---|---|---|
| 10,062,036 B2 | 8/2018 | Mermoud et al. | |
| 10,536,380 B2 | 1/2020 | Das et al. | |
| 11,088,953 B2 | 8/2021 | Larumbe et al. | |
| 11,172,048 B2 | 11/2021 | Chatterjee | |
| 2019/0007270 A1* | 1/2019 | Suragi Math | ....... H04L 41/5003 |
| 2019/0182123 A1 | 6/2019 | Gupta et al. | |

(Continued)

OTHER PUBLICATIONS

Nadig, et al., "APRIL: An Application-Aware, Predictive and Intelligent Load Balancing Solution for Data-Intensive Science", IEEE Infocom 2019—IEEE Conference on Computer Communications, Apr./May 2019, pp. 1909-1917, IEEE.

*Primary Examiner* — Asad M Nawaz
*Assistant Examiner* — Najeeb Ansari
(74) *Attorney, Agent, or Firm* — Lee & Hayes, P.C.

(57)     ABSTRACT

In one embodiment, a device obtains metrics for a plurality of network paths via which traffic for an online application may be conveyed. The device models, for each of the plurality of network paths, uncertainty of an application experience metric predicted for the online application across different values of one or more metrics for that path, based on its obtained metrics. The device generates, based on the uncertainty of the application experience metric modeled for each of the plurality of network paths, a load balancing schedule for the plurality of network paths, to maximize the application experience metric for the online application across the plurality of network paths and with a minimal amount of uncertainty. The device causes traffic for the online application to be load balanced across the plurality of network paths in accordance with the load balancing schedule.

20 Claims, 11 Drawing Sheets

(56)                    References Cited

U.S. PATENT DOCUMENTS

| | | | |
|---|---|---|---|
| 2019/0334822 A1 | 10/2019 | Larumbe et al. | |
| 2019/0386918 A1* | 12/2019 | Iyer | H04L 43/0829 |
| 2020/0084293 A1 | 3/2020 | Chatterjee | |
| 2022/0321496 A1* | 10/2022 | Julien | H04L 47/762 |
| 2023/0012609 A1* | 1/2023 | Wang | H04L 43/10 |
| 2023/0231785 A1* | 7/2023 | Kumar | H04L 41/0631 |
| | | | 709/224 |
| 2023/0246724 A1* | 8/2023 | Pateromichelakis | |
| | | | H04W 72/0453 |
| | | | 370/329 |
| 2024/0154881 A1* | 5/2024 | Pasupathy | H04L 43/091 |

* cited by examiner

PREDICTIVE ROUTING PROCESS 248

UNCERTAINTY MODELER 502

TRAFFIC DEMAND FORECASTER 504

UNCERTAINTY BASED LOAD-BALANCER 506

EDGE TRAFFIC REDIRECTOR 508

CONGESTION ALERTER 510

APPLICATION EXPERIENCE LEARNER 512

PREDICTIVE APPLICATION-AWARE LOAD-BALANCING BASED ON FAILURE UNCERTAINTY

TECHNICAL FIELD

The present disclosure relates generally to computer networks, and, more particularly, to predictive application-aware load-balancing based on failure uncertainty.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. A primary challenge, however, in extending these techniques to large-scale networks is the uncertainty involved. Indeed, there may be thousands of paths in an enterprise network that convey traffic for hundreds of online applications. Thus, it is highly unlikely for there to be observed performance metrics from the network across every possible value and for each path and application combination. This means that the uncertainty can vary significantly with respect to any performance predictions. In addition, different applications may be more tolerant to different conditions than others. For instance, one application may be resilient to packet loss up to 30%, while another application may only be resilient to loss at a much lower percentage.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
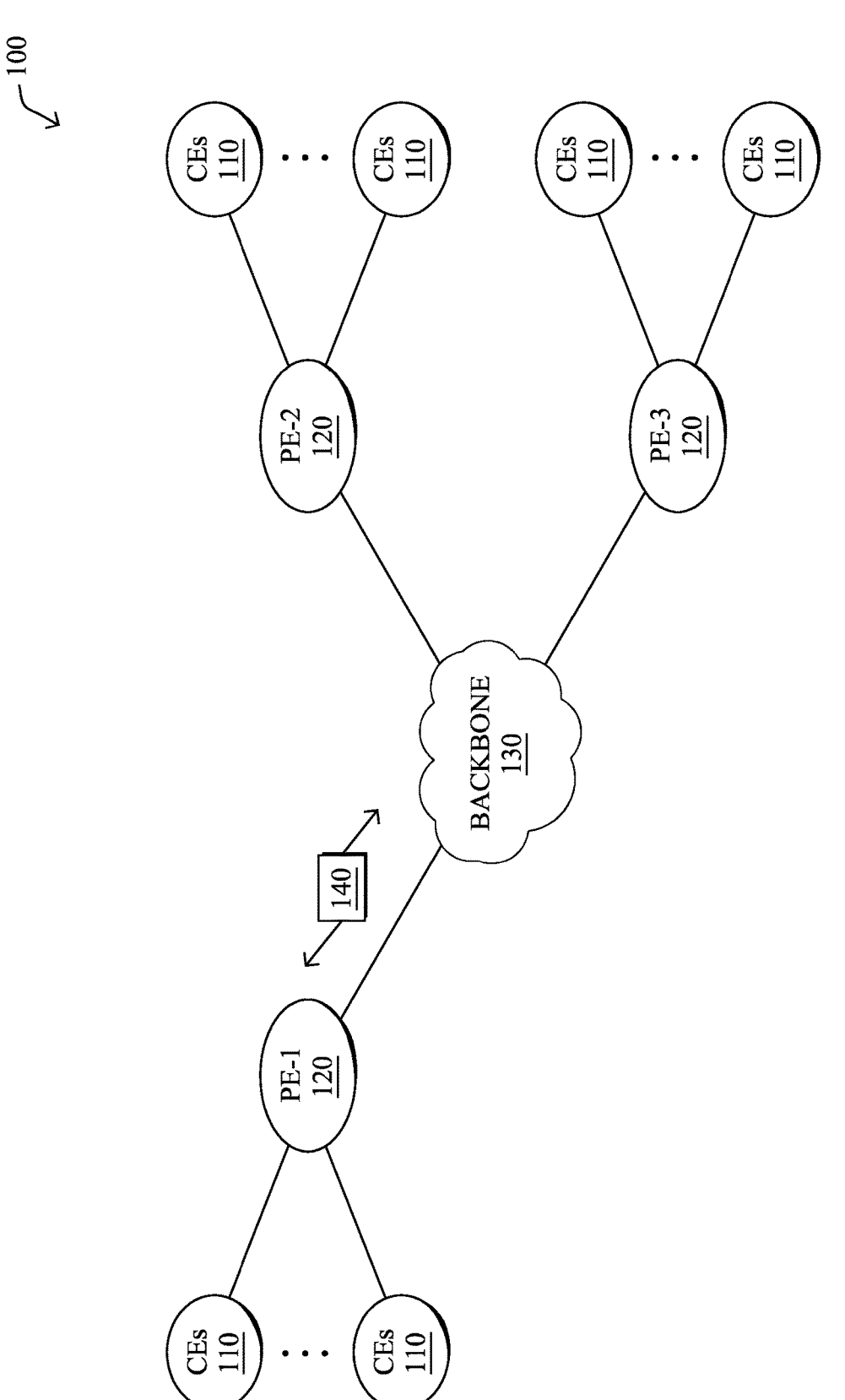
FIGS. 1A-1B illustrate an example communication network.

According to one or more embodiments of the disclosure, a device obtains metrics for a plurality of network paths via which traffic for an online application may be conveyed. The device models, for each of the plurality of network paths, uncertainty of an application experience metric predicted for the online application across different values of one or more metrics for that path, based on its obtained metrics. The device generates, based on the uncertainty of the application experience metric modeled for each of the plurality of network paths, a load balancing schedule for the plurality of network paths, to maximize the application experience metric for the online application across the plurality of network paths and with a minimal amount of uncertainty. The device causes traffic for the online application to be load balanced across the plurality of network paths in accordance with the load balancing schedule.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
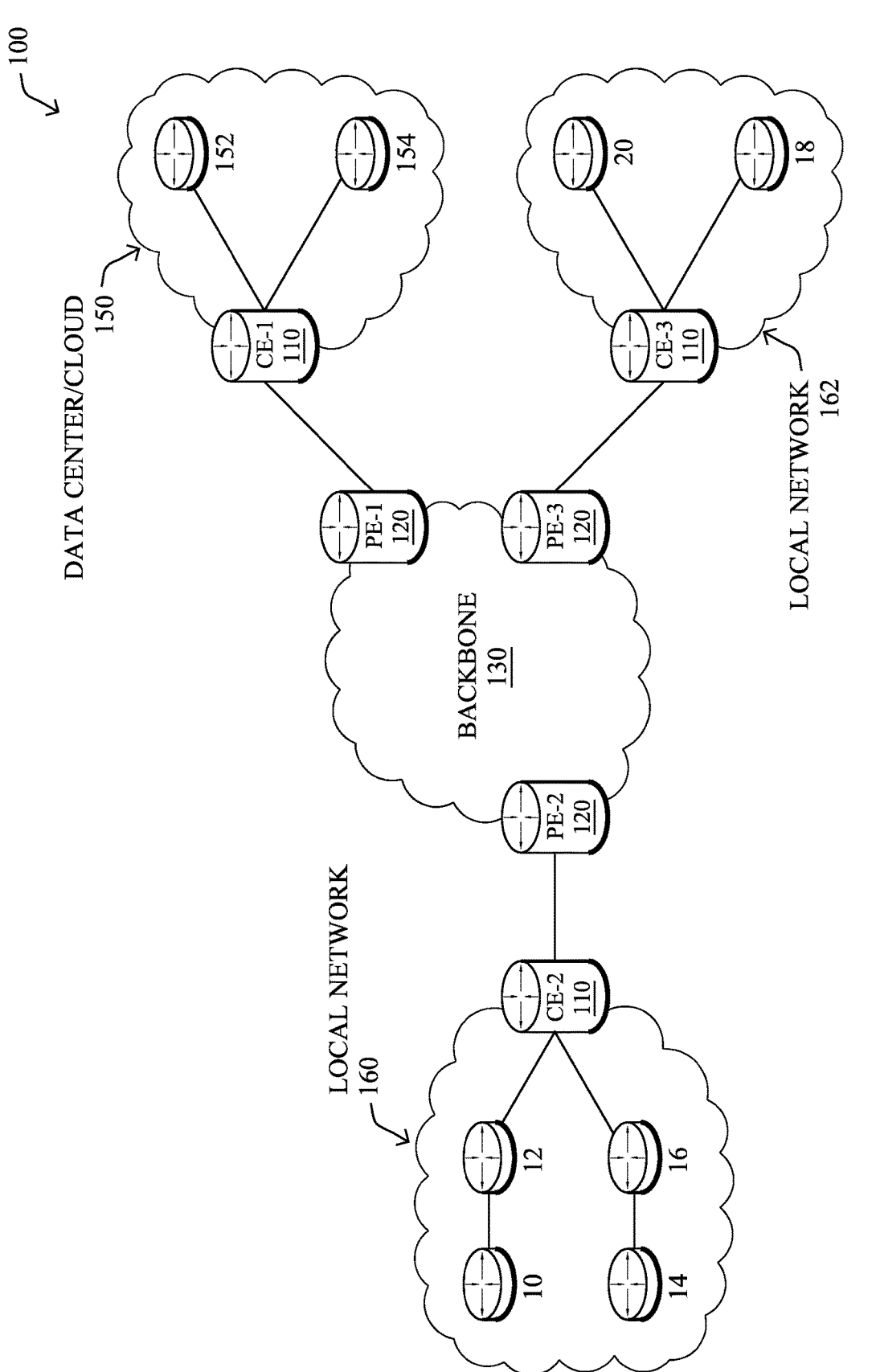

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
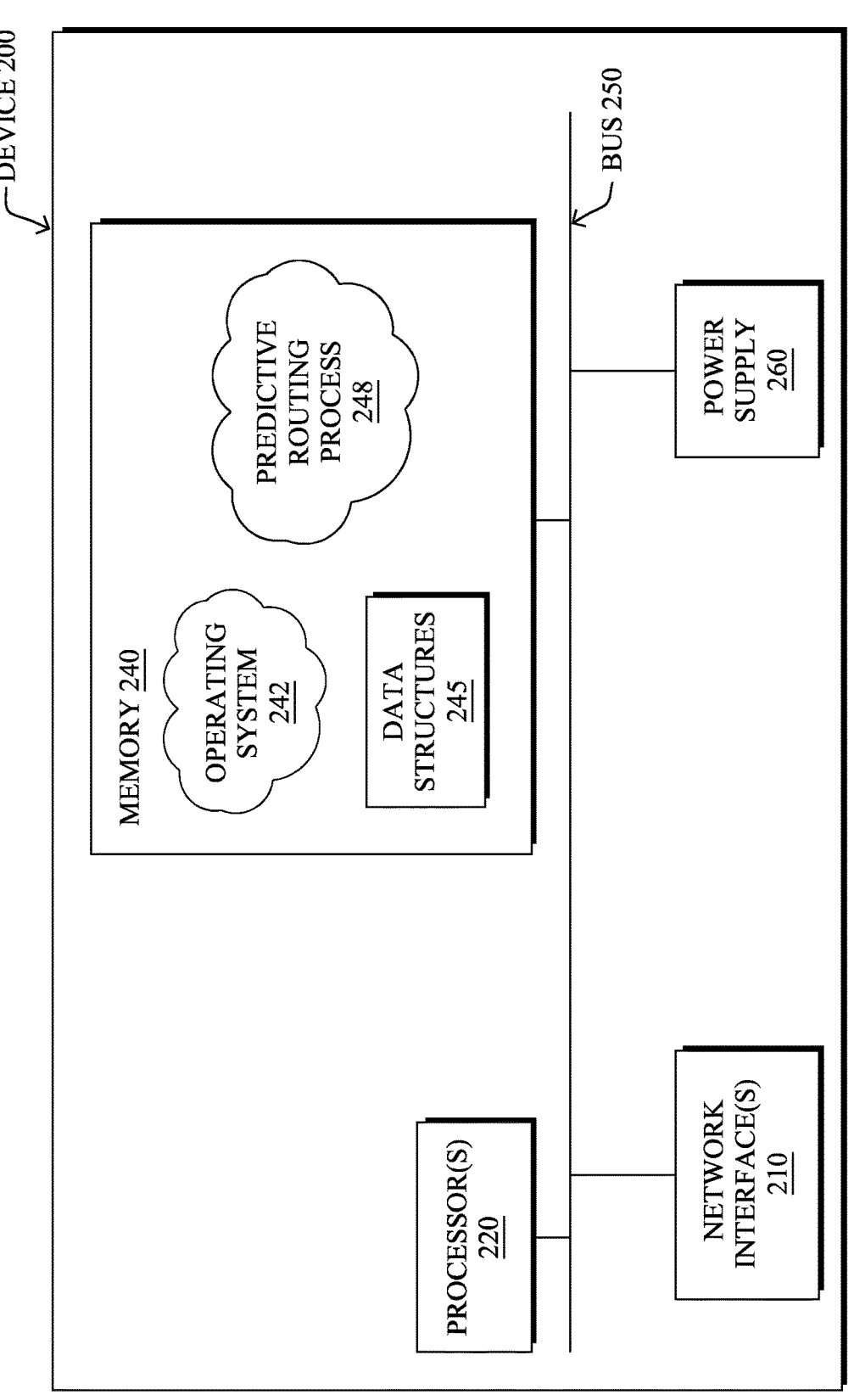
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may include computer executable instructions that, when executed by processor(s) 220, cause device 200 to perform the techniques described herein. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
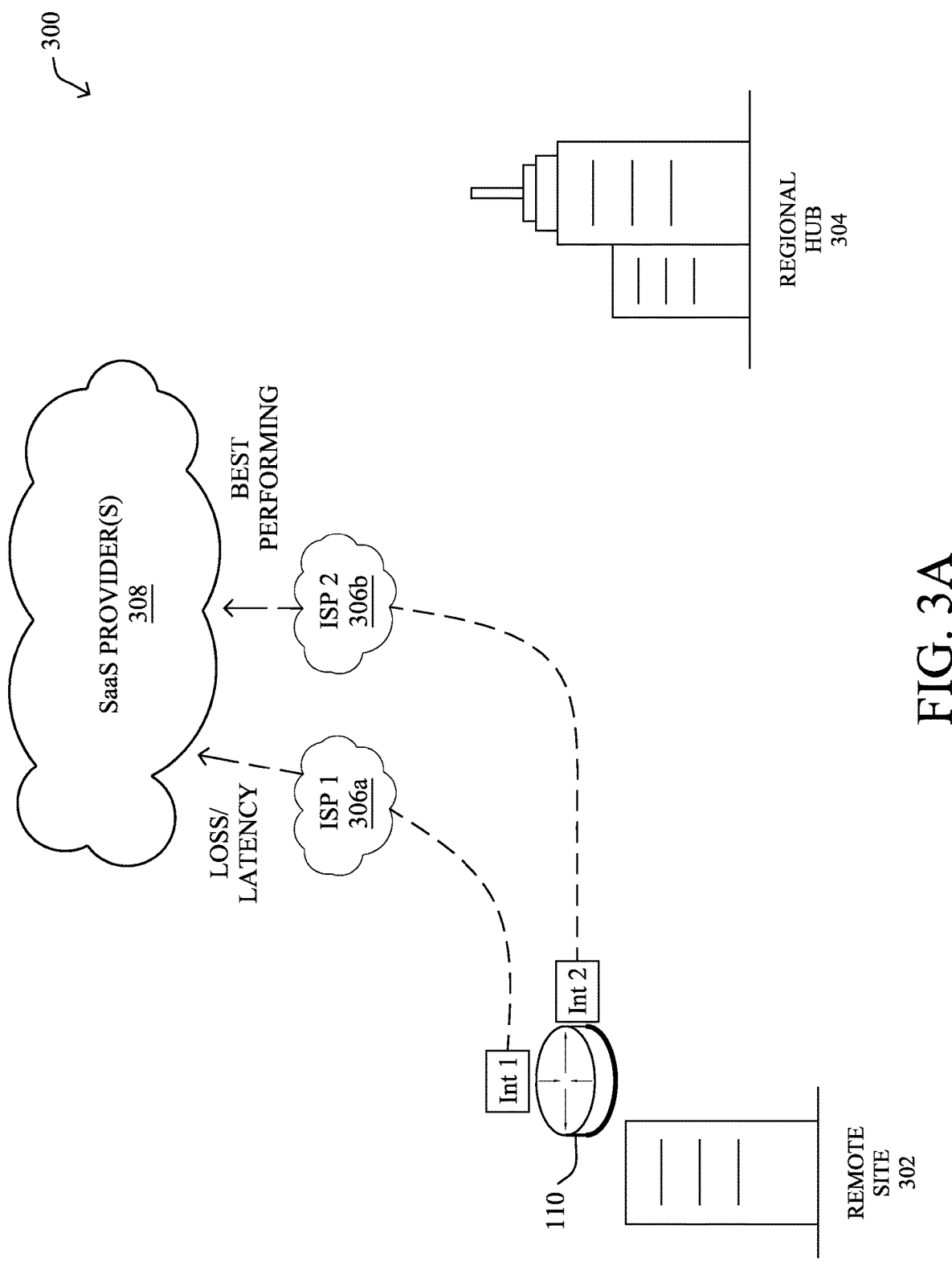
FIGS. 3A-3B illustrate example network deployments.
Figure 3B:

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
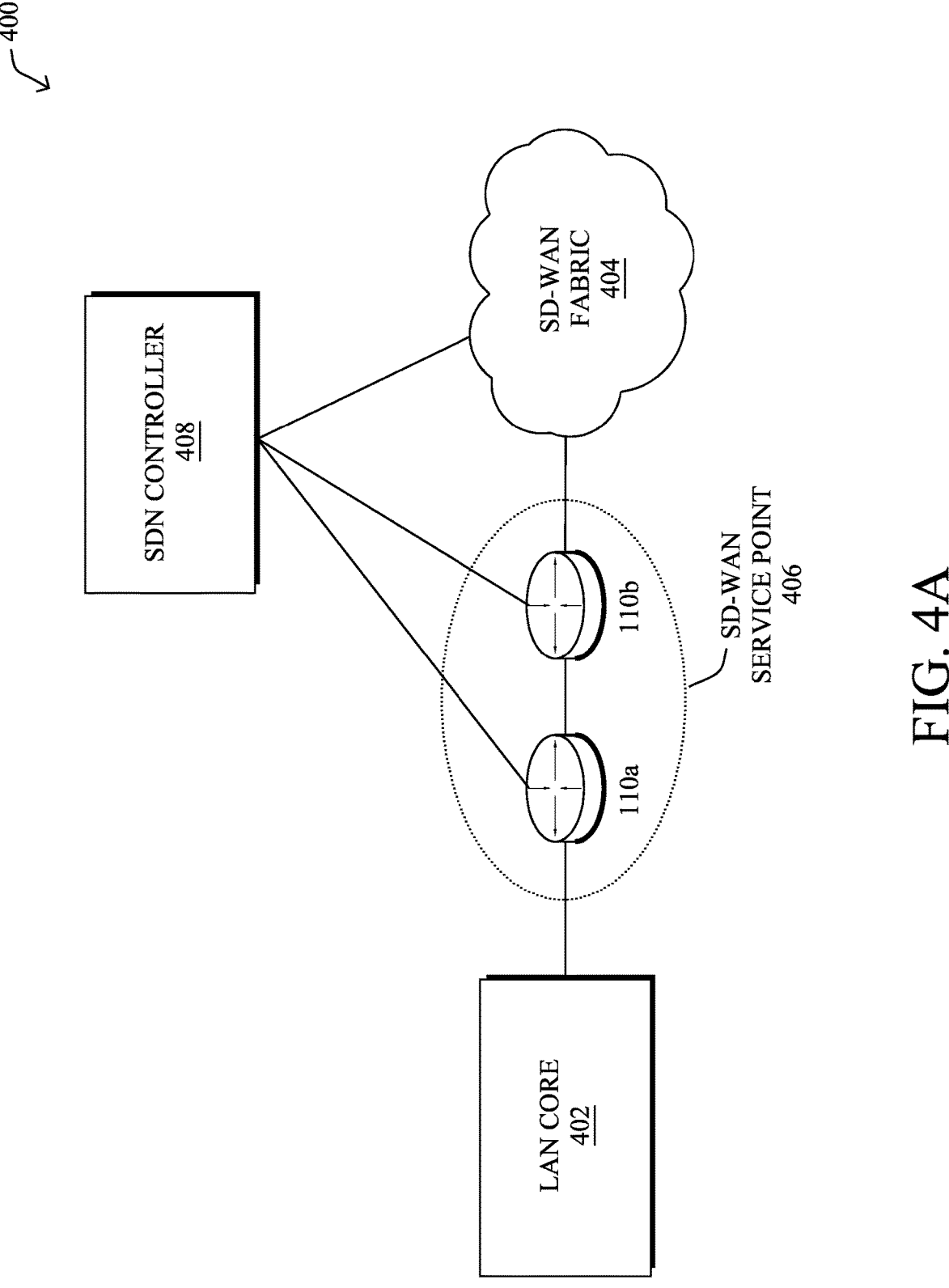
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110h.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies e.g., security policies, etc.), installing or adjusting IPsec routes/tunnels between LAN core 402 and remote destinations such as regional hub 304 and/or SaaS provider(s) 308 in FIGS. 3A-3B, and the like.

A primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending Hypertext Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
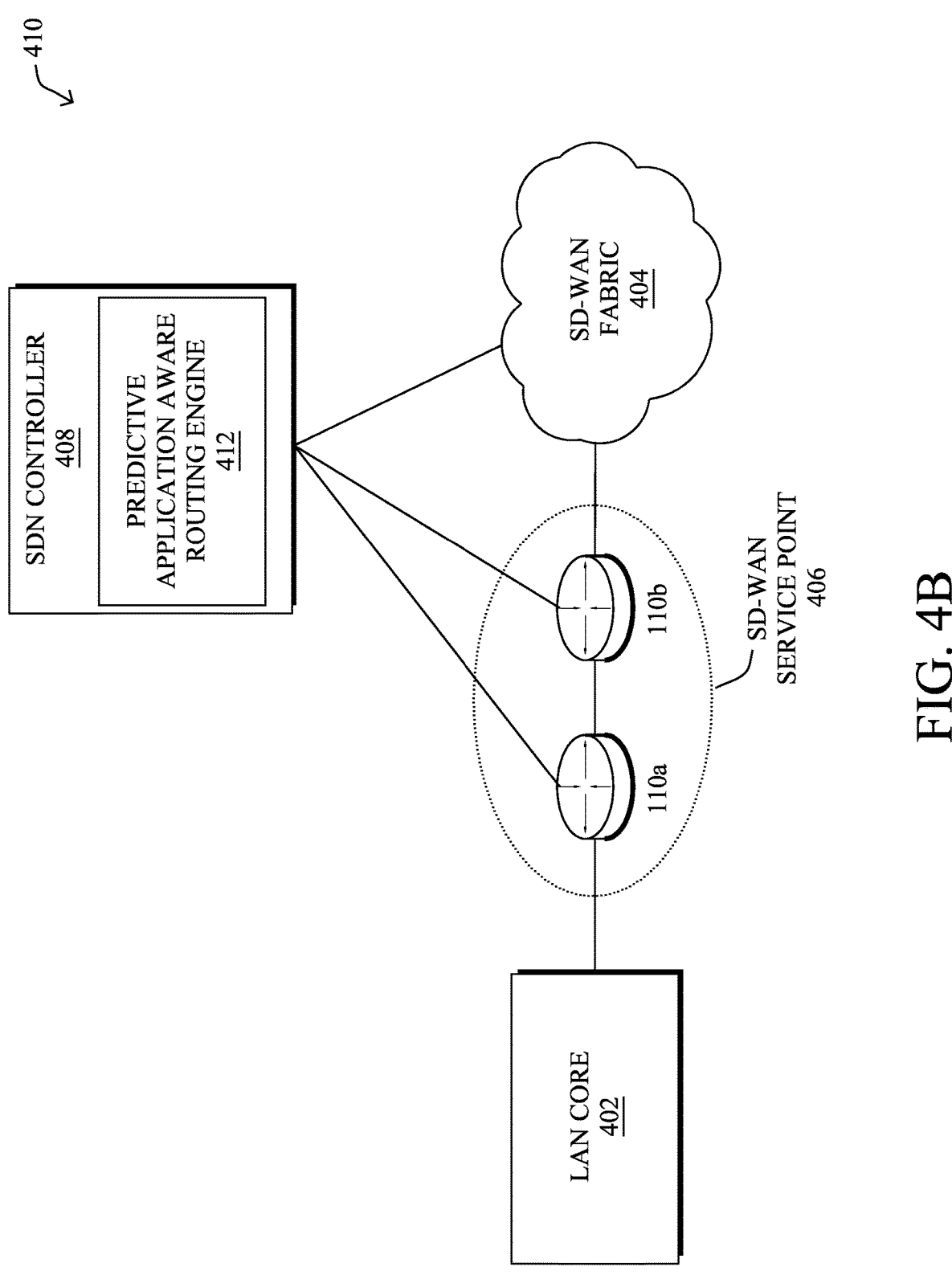

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110h, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As would be appreciated, modern SaaS applications are typically delivered globally via public cloud infrastructure using cloud native services. Even though public cloud providers may have a high number of points of presence (PoPs) and use those to deliver the application, globally. Still, testing has shown that user quality of experience (QoE) may vary greatly based on the location of the user. This is because all public cloud providers are delivering services which are region-based and applications are running in specific region(s) and location(s). Indeed, even though it might seem that an online application is global (e.g., because of its use of globally-available CloudFront POPs, etc.), in reality it might run in a single region/location and user experience might vary greatly based on the location.

To determine the QoE for a particular SaaS application, various approaches are possible such as:

Obtaining user feedback directly from the application

Applying traffic analytics, such as by analyzing Netflow records that include extra metrics like Application Response Time (ART)

Sending synthetic path probes to measure networking metrics to each SaaS application from each location. These probes are 'synthetic' in that they seek to mimic the actual characteristics of the traffic of the application under scrutiny.

The first approach above is rarely used today because of its complexity, but can still be used with the techniques herein. Note that relying on direct user feedback to drive routing decisions would also require supporting application programming interfaces (APIs) and the relevant network telemetry, in order to optimize the routing. The second and third approaches above are well-suited for use in Secure Access Service Edge (SASE)/SD-WAN implementations, In various embodiments, predictive application aware routing engine 412 may make use of any or all of the above approaches. For instance, predictive application aware routing engine 412 may make use of an API for a particular online application, allowing it to obtain application experience/QoE metrics directly from the application. Such metrics may be combined with probing results and/or path telemetry. This is in sharp contrast to network-centric approaches that do not necessarily reflect the true user experience.

As noted above, a primary challenge to routing traffic in an effort to afford good application experience for an online application is the uncertainty of meeting future application experience collectively on a network. Indeed, there may be thousands of paths in an enterprise network that convey traffic for hundreds of online applications. Thus, it is highly unlikely for there to be observed performance metrics from the network across every possible value and for each path and application combination. This means that the uncertainty can vary significantly with respect to any performance predictions. In addition, different applications may be more tolerant to different conditions than others. For instance, one application may be resilient to packet loss up to 30%, while another application may only be resilient to loss at a much lower percentage As a consequence of the uncertainty, optimizing the load balancing in the network across the various online applications and paths in a manner that ensures good application experience is currently not done today. Instead, traditional load balancing techniques such as Equal Cost Multipath (ECMP) load-balancing, is still being used and not in a predictive way. However, this does not mean that application traffic cannot be conveyed via multiple paths such that the overall application experience is maximized. For example, voice traffic requires a relatively small amount of throughput but at a high degree of certainty and low values of loss, latency, and jitter. This presents an opportunity to load balance voice traffic on paths that have lower throughput but also low uncertainty as to whether doing so will result in acceptable application experience. Conversely, Office365 (O365) traffic could be sent on any alternate path where throughput may be higher, but say, jitter might fluctuate to relatively higher levels.

Ensuring traffic flows are scheduled on paths where application experience is satisfied of utmost importance for providing good user experience. However, currently there is no system that can predict the application experience on different paths as a function of traffic, and can proactively rebalance the forecasted load across applications on different paths such that all or most applications have good application experience.

Predictive Application-Aware Load-Balancing Based on Failure Uncertainty

The techniques herein introduce a learning-based (predictive) load-balancing system that utilizes predicted application experience and its uncertainty, in order to load balance traffic on many paths. In some aspects, the techniques herein can be used to model the uncertainty of providing acceptable application experience given the current and past network conditions using a learning approach. In further aspects, the techniques herein forecast and estimate the uncertainty of the application experience over paths, to proactively propose the loads, on a per-application and per-path basis, such that application experience is maximized. In yet other aspects, the techniques herein also introduce a quick, reactive approach to load-balance in cases where the predicted best paths start violating application experience.

Illustratively, the techniques described herein may be performed by hardware, software, and/or firmware, such as in accordance with predictive routing process 248, which may include computer executable instructions executed by the processor 220 (or independent processor of interfaces 210) to perform functions relating to the techniques described herein.

Specifically, according to various embodiments, a device obtains metrics for a plurality of network paths via which traffic for an online application may be conveyed. The device models, for each of the plurality of network paths, uncertainty of an application experience metric predicted for the online application across different values of one or more metrics for that path, based on its obtained metrics. The device generates, based on the uncertainty of the application experience metric modeled for each of the plurality of network paths, a load balancing schedule for the plurality of network paths, to maximize the application experience metric for the online application across the plurality of network paths and with a minimal amount of uncertainty. The device causes traffic for is the online application to be load balanced across the plurality of network paths in accordance with the load balancing schedule.

Figure 5:
FIG. 5 illustrates an example architecture for predictive application-aware load-balancing based on failure uncertainty.
Figure 5:
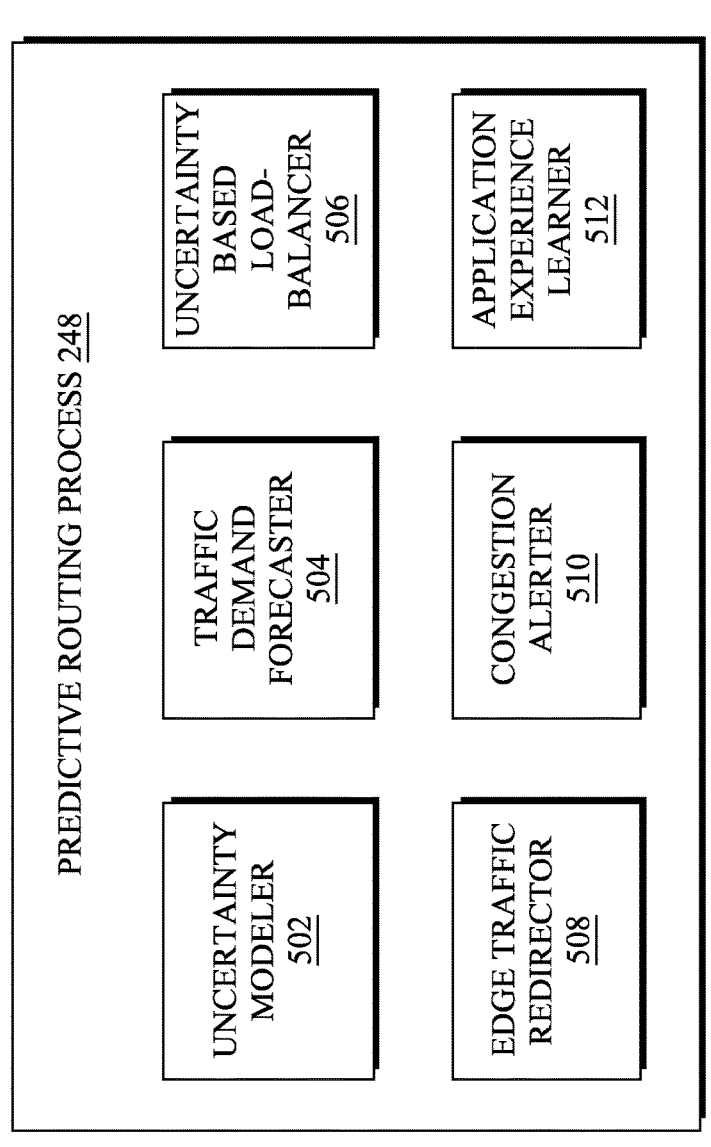

Operationally, FIG. 5 illustrates an example architecture 500 for detecting application performance breaking points based on uncertainty and active learning, according to various embodiments. At the core of architecture 500 is predictive routing process 248, which may be executed by a controller for a network or another device in communication therewith. For instance, predictive routing process 248 may be executed by a controller for a network (e.g., SDN controller 408 in FIGS. 4A-4B), a particular networking device in the network (e.g., a router, etc.), another device or service in communication therewith, or the like. In some embodiments, for instance, predictive routing process 248 may be used to implement a predictive application aware routing engine, such as predictive application aware routing engine 412.

As shown, predictive routing process 248 may include any or all of the following components: an uncertainty modeler 502, a traffic demand forecaster 504, an uncertainty based load-balancer 506, an edge traffic redirector 508, a congestion alerter 510, and/or an application experience learner 512. As would be appreciated, the functionalities of these components may be combined or omitted, as desired. In addition, these components may be implemented on a singular device or in a distributed manner, in which case the combination of executing devices can be viewed as their own singular device for purposes of executing predictive routing process 248.

For simplicity, it is presumed that predictive routing process 248 has access to a datalake of metrics collected for various paths in the network via which traffic for any number of online applications could be routed. Such a datalake may be maintained by predictive routing process 248 or by another process in the network, in various embodiments. For instance, the datalake may store metrics collected from the various routers or other networking devices, the online applications themselves, or other information sources. By way of example, the datalake may include health metrics collected from different probes (such as BFD) that indicate path metrics such as loss, latency, jitter, throughput, etc. on all tunnels and/or direct Internet access (DIA) paths. The datalake may also include NetFlow data that describes the application usage in the network. If available, the datalake may further store feedback data available from the various online applications, such as user-provided ratings as to the application experience. This application feedback data may be represented as a continuous number or a discrete value (such as 'good,' 'degraded,' 'bad,' or 'no-opinion') and/or may also comprise multiple feedback metrics. Of course, if such application feedback is not available for use for an application experience metric, SLA template information could be used as a proxy for the application experience metric, instead.

In various embodiments, uncertainty modeler 502 may be responsible for modeling application degradation as a function of a single metric or a set of metrics. For instance, uncertainty modeler 502 may use machine learning or a statistical approach to predict an application experience metric for a particular application and path, given different values for the one or more metrics. In doing so, uncertainty modeler 502 may also determine the degree of uncertainty for the application experience metric at the different values of the single metric or set of metrics. In a preferred embodiment, uncertainty modeler 502 will model the uncertainty in the application experience for each path. In general, a path may be described as a pair of interfaces on two edge routers or between an interface on an edge router and online/SaaS application). By way of example, uncertainty modeler 502 may determine the uncertainty in the application experience as it relates to the throughput of the path traffic.

In some embodiments, uncertainty modeler 502 may model the uncertainty of the application experience for an application and path using a Gaussian Process or other suitable estimation technique. By way of illustration, 502/ may model application feedback from a web conferencing application as a function of the throughput on the path. Note that if an SLA template-based approach is chosen (e.g., because application feedback is not available), then the probability of SLA violation could instead be modelled as a function of throughput. The output of the model is a per-path per-application uncertainty models of experience as a function of traffic (e.g., throughput). For example, it can provide a model for each <sourceNode, sourceInterface, destinationNode, destinationInterace, applicationName>. Note that the sourceNode and destinationNode can be edge routers or a SaaS application endpoint.

Figure 6:
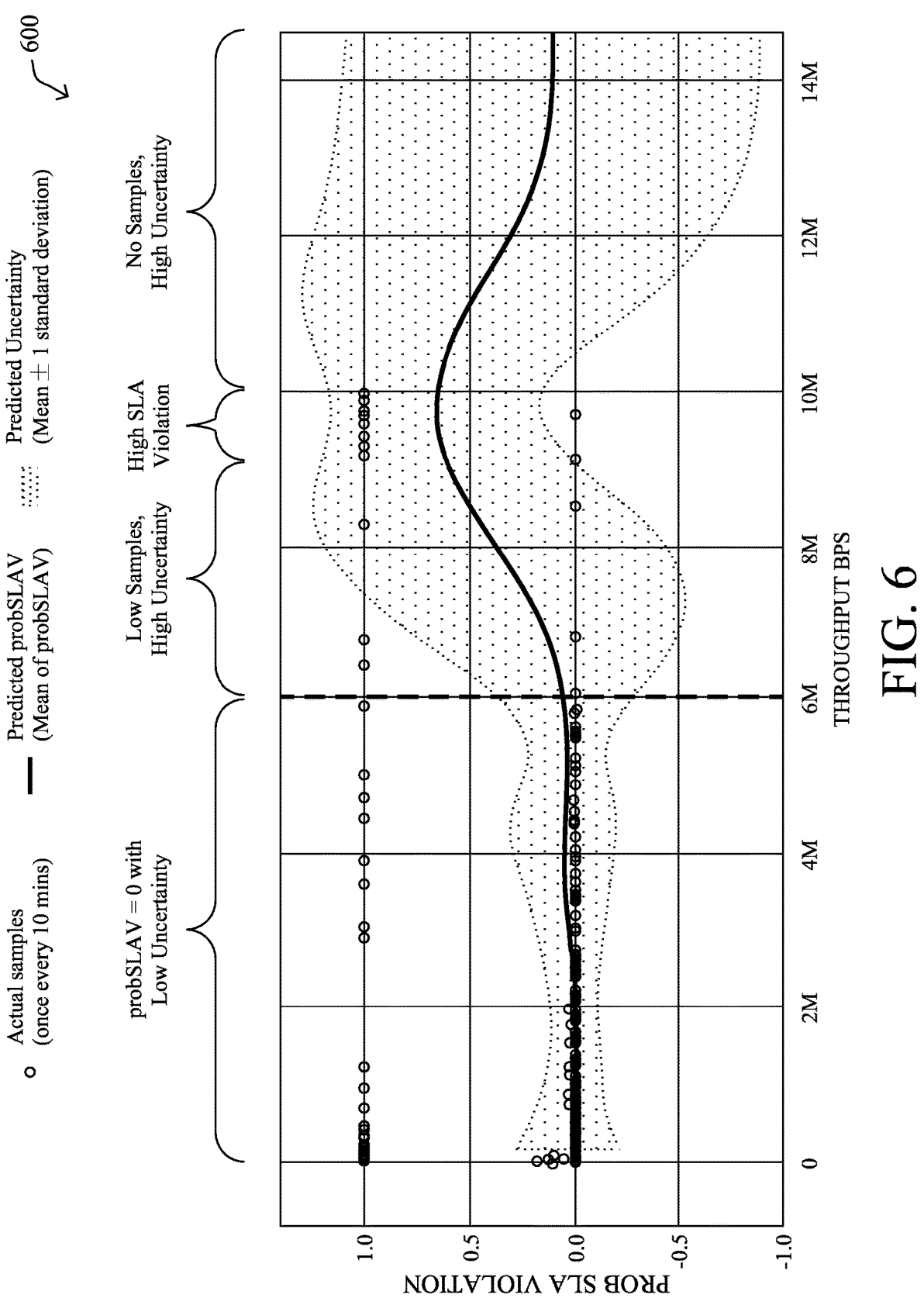
FIG. 6 illustrates an example plot of an application experience metric versus throughput.

FIG. 6 illustrates an example plot 600 of an application experience metric versus throughput, in various embodiments. More specifically, plot 600 shows the modeling of one path by uncertainty modeler 502 where the application experience score (probability of SLA violation) for a voice application is modeled as a noisy Gaussian Process against the throughput utilized on the path. Here, the uncertainty band shown represents the uncertainty associated with the probability of SLA violation for a given value of throughput. From plot 600, it can be seen that the path can handle a throughput of application traffic of up to 6 Mbps, after which the voice traffic may experience degradation in the application experience. Note also that the uncertainty varies throughout plot 600 whereby a higher number of samples at a certain throughput value that are actually observed for the path tend to reduce the amount of uncertainty for the probability of an SLA violation at that value. Indeed, it may be almost certain that there will not be an SLA violation below 6 Mbps, as well as there being an SLA violation when the throughput is between 9-10 Mbps, due to the large number of samples collected in these ranges. However, in other ranges of the throughput, there may be a relatively low number of samples, or even no samples at all, leading to high uncertainty for the probability of SLA violation in these throughput ranges.

Referring again to FIG. 5, in other embodiment, uncertainty modeler 502 may also construct a single model across different networks and/or applications. In this case, a neural network model or a quartile regression model may be constructed to output the application experience uncertainty based on several input features such as path throughput, loss, latency, and jitter.

In yet other embodiments, uncertainty modeler 502 may construct a model that models the application experience of a path as a function of throughput on head interface (e.g., at source). In addition, it may al construct a similar model to model the application experience of the path with respect to tail interface (at destination). The output from these models can then be combined by uncertainty modeler 502. For example, the path is can be deemed as producing bad experience if the models predict high probability of SLA violation at both head and tail interface. Ultimately, uncertainty modeler 502 will still need to determine whether the path, not the interface, is throughput-sensitive for a given throughput.

Traffic demand forecaster 504 may be responsible for forecasting the interface throughput or other proxies for the traffic load in the near future. In one embodiment, timeseries of per-application throughput between a pair of end-routers is forecasted. Machine learning forecasting algorithms such as Autoregressive Integrated Moving Average (ARIMA) or Long-Short Term Memory (LSTM) may be used by traffic demand forecaster 504 to model such traffic demands. For instance, traffic demand forecaster 504 may input the timeseries of throughput demand until time t, along with possibly many other features such as number of users, user-sessions seen until t, etc., and then forecast the traffic demand at time t+1. Note that this problem may also be solved by traffic demand forecaster 504 using any regression-based machine-learning algorithm. In general, the purpose of traffic demand forecaster 504 is to predict the volume of traffic in the (near) future so as to avoid making new load balancing recommendation on instantaneous observations and, thus, avoid instabilities.

In various embodiments, uncertainty based load-balancer 506 may be responsible for determining which applications should be scheduled on which paths based on: 1.) the uncertainty of application experience obtained from uncertainty modeler 502, and 2.) the traffic demand from traffic demand forecaster 504, if used. To do so, uncertainty based load-balancer 506 may first fetch the traffic demand forecasts from traffic demand forecaster 504 for a pair of edge routers in the form of, say, <sourceNode, destinationNode, applicationName, trafficForecasted>. Then, uncertainty based load-balancer 506 may fetch the model from uncertainty modeler 502 to predict uncertainty between all paths between those routers or the results of such a model.

Of course, uncertainty based load-balancer 506 may not have enough datapoints to determine with enough certainty whether an interface is sensitive to throughput. If this is the case, uncertainty based load-balancer 506 may cause the performance of one or is more experiments, in order to obtain such datapoints. In one embodiment, such an experiment may entail dynamically rerouting the application traffic onto the path for a specific amount of time until enough data points are generated to improve the uncertainty level. In another embodiment, such an experiment may be conducted by sending synthetic traffic along the interface/path, as opposed to the real application traffic. In some embodiments, these experiments may be controlled by a policy specified, for instance, by an administrator via a user interface.

In one embodiment, uncertainty based load-balancer 506 may use a greedy algorithm to assign the 'best' application traffic to the 'best' path, after querying the model for the predicted application experience and its uncertainty. For example, let b(A, B, voice), b(A,B, SharePoint), b(A, B, cifs-smb) Mbps be the predicted traffic between source node A and destination node B for applications voice, SharePoint and CIFS/samba applications, respectively. In such a case, uncertainty based load-balancer 506 may maintain a forecasted-path-load table for expected traffic for each path that is initialized to zero (e.g., {P1: 0 Mbps; P2: 0 Mbps}). To start, uncertainty based load-balancer 506 may opt to first assign the application traffic for the application that is the most sensitive (e.g., the voice application) to path(s) in the network that will provide the best application experience.

Continuing the example of the three applications, uncertainty based load-balancer 506 may first evaluate the voice application experience on Path1 and on Path2 using the models or data provided by uncertainty modeler 502 between A and B, and for a throughput b(A, B, voice). The path with the best application experience, say Path1, may then be allocated for voice, and uncertainty based load-balancer 506 will update the forecasted-path-load table to {P1: b(A, B, voice) Mbps; P2: 0 Mbps}). Note that the most sensitive applications may also be scheduled on paths where the application experience metric is expected to be high with low uncertainty. If the uncertainty is higher, uncertainty based load-balancer 506 may instead attempt to schedule that traffic on an alternate path. If all of the paths have high-uncertainty, uncertainty based load-balancer 506 may prefer to schedule the traffic on the path with the best mean application is experience.

Once uncertainty based load-balancer 506 has scheduled the traffic for the voice application, it may move on to the next most sensitive traffic, say the traffic for SharePoint. Similar to the voice traffic, uncertainty based load-balancer 506 may use the models and/or data from uncertainty modeler 502 to evaluate the application experience and uncertainty for paths P1 and P2. While doing so, it may also assess whether assigning the SharePoint traffic to either of these paths in combination with that of the voice application will lead to degraded application experience. In other words, uncertainty based load-balancer 506 may check the application experience and uncertainty for both the SharePoint and voice applications on path P1 with the combined load (b(A, B, voice)+b(A, B, SharePoint)). If any of the application experience metrics would be degraded, then uncertainty based load-balancer 506 may opt not to assign the SharePoint traffic to P1.

Finally, uncertainty based load-balancer 506 may use a similar approach to the above, to schedule the CIFS/samba traffic onto either or both of paths P1 and P2. At the end of this processing, each path will have assignments for each application. Of course, if all of the traffic cannot be assigned to all of the paths without likely resulting in degraded application experience, uncertainty based load-balancer 506 may opt to schedule the traffic so as to minimize the disruption to the most sensitive traffic (e.g., the traffic for the voice application).

In some embodiments, uncertainty based load-balancer 506 may also interact with a user interface, to receive input from an administrator. For instance, the administrator may specify certain rules that can be used by uncertainty based load-balancer 506 when generating a load balancing sched-ule for the application traffic. Such rules may, for example, specify that certain paths should never be used to convey traffic for a specific application (e.g., the admin may set a rule to always schedule voice traffic on MPLS paths, and to never schedule YouTube traffic on MPLS paths). Other rules may also specify default paths that could be used for applications when many paths offer similar application experience. Other information that uncertainty based load-balancer 506 may is provide to the user interface may include the <sourceNode, destinationNode> pairs with the forecasted load-balanced schedules for applications, along with their associated application experience metrics and uncertainty. This information could then be used by the administrator to add additional rules per endpoint pair or to override certain existing rules.

In other embodiments, uncertainty based load-balancer 506 may opt to split the sessions of a single application between two or more paths. For example, x-number of sessions of voice could be scheduled on P1, and y-number sessions on P2. In yet another embodiment, uncertainty based load-balancer 506 may pre-provision an extra buffer throughout for each application session by adding a small delta throughput to b(A, B, voice), b(A,B, sharepoint), b(A, B, cifs-smb). In yet another embodiment, uncertainty based load-balancer 506 may use a dynamic programming algorithm to optimally schedule the application traffic on multiple paths.

The output of uncertainty based load-balancer 506 is the proposed load-balancing schedule for the application traffic on several paths between two nodes for a given time-period [t, t+delta]. To cause the schedule to be implemented in the network, uncertainty based load-balancer 506 may push the schedule to the network controller or edge routers, via custom messaging.

In yet another embodiment, uncertainty based load-balancer 506 may consider adding new paths so as to reduce the level of uncertainty. For example, in an SD-WAN network, the network administrator may decide to route voice traffic to a hub using multiple MPLS tunnels (path P1 and P2), with another DIA path P3 also being available as another option. Through execution of uncertainty based load-balancer 506, the system may determine the most effective load balancing strategy among the set of paths to reduce the risk of SLA violation and dynamically decide to add the third path P3 to the pool of available path, even though such a path (e.g., over the Public Internet) may not a priori be considered an optimal candidate. The use of load balancing allows for greater flexibility especially when combined with learning.

Edge traffic redirector 508 may be responsible for scheduling the traffic on best is path as, and when, new sessions are generated. In some instances, edge traffic redirector 508 may be hosted directly on the edge router(s) responsible for the application traffic. In one embodiment, the model or data from uncertainty modeler 502 may be pushed to edge traffic redirector 508. In turn, edge traffic redirector 508 may maintain the current observed applications and their throughputs on different paths between the edge router and each remote node. Whenever a new session is initiated, it may utilize algorithms similar to uncertainty based load-balancer 506 to check where to add the new user session. For example, consider an example where there are two paths P1 and P2 between the edge router and a given destination edge router. It maintains path-load table with current loads on paths, and also the sessions scheduled on those paths. For every new session, edge traffic redirector 508 may compute the application experience on all other paths. If the new session, or any of existing sessions, has degraded application experience with the additional predicted load, it will not schedule traffic on that path.

In other embodiments, edge traffic redirector 508 may also reshuffle the applications between paths for maximizing the application experience. However, such reshuffling may be kept to a minimum, so as to not disrupt the existing flows.

A further potential component of predictive routing process 248 is congestion alerter 510, which is responsible for sending alerts when, despite the best effort of the system, still result in degraded application experience, such as due to possible capacity shortages on the paths, in some embodiments. Congestion alerter 510 may also provide to a user interface additional information, such as the <sourceNode, destinationNode> pairs that have regular poor application experience metrics, despite the best efforts by the system to load balance the application traffic. Associated traffic of different applications, and the predicted application experience uncertainty, may be shown by congestion alerter 510 to the administrator for further action. In turn, the administrator may opt to change the SLA thresholds or take a manual action to upgrade a few paths, after repeatedly seeing that those few applications cannot be provisioned for good user experiences.

In various embodiments, application experience learner 512 may be responsible for directing a small number of sessions on paths where application experience uncertainty is higher. Note that the uncertainty based load-balancer 506 attempts to schedule traffic on paths with a maximum application experience and with the lowest uncertainty. However, there may still arise cases where the uncertainty may be high in certain realms of traffic.

Figure 7:
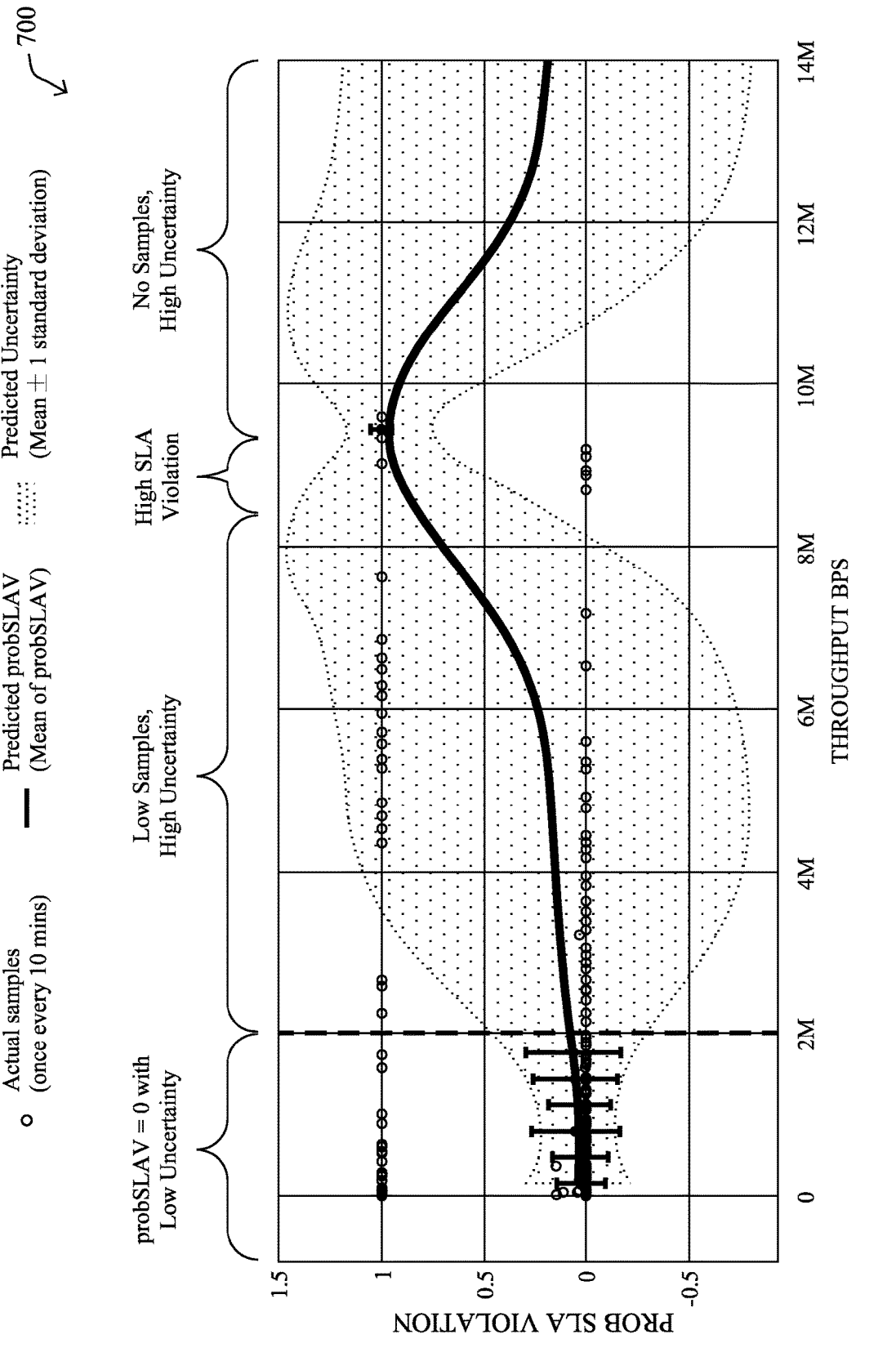
FIG. 7 illustrates another example plot of an application experience metric versus throughput.

By way of example, FIG. 7 illustrates another example plot 700 of an application experience metric versus throughput, in various embodiments. As can be seen, there are two regions of low uncertainty: 1.) the probability of an SLA violation is low when the throughput <2 Mbps and 2.) the probability of an SLA violation is high at a throughput of 9 Mbps. However, the uncertainty for other throughput values is considerably higher for other throughput values. This is because that there are no sufficient data points observed for those ranges of throughput values. Thus, application experience learner 512 may initiate one or more experiments to test the response in these ranges, to better learn the uncertainty.

If a Gaussian Process is used to model the uncertainty, application experience learner 512 may directly use the uncertainty measurements to decide whether to perform an experiment on the path, such as redirecting a few sessions on the path at a certain throughput. For example, upon finding that path has high uncertainty, uncertainty modeler 502 may request analysis by application experience learner 512 for a recommended course of action. Application experience learner 512 may provide a suggestion to divert x number of sessions (e.g., to test the application experience metric at a certain throughput). In one embodiment, application experience learner 512 may utilize the path model from uncertainty modeler 502 and first check whether the uncertainty at the current throughput level is in fact due to a lack of data. Indeed, it may be because of other effects such as the throughput simply not being correlated with the application experience metric. If so, application experience learner 512 may then choose to divert existing flows Fi with a small probability p. Flows chosen in this manner ({F1, F2, . . . Fn}) may be communicated to the uncertainty modeler 502 to be pinned to the is path with uncertainty.

Figure 8:
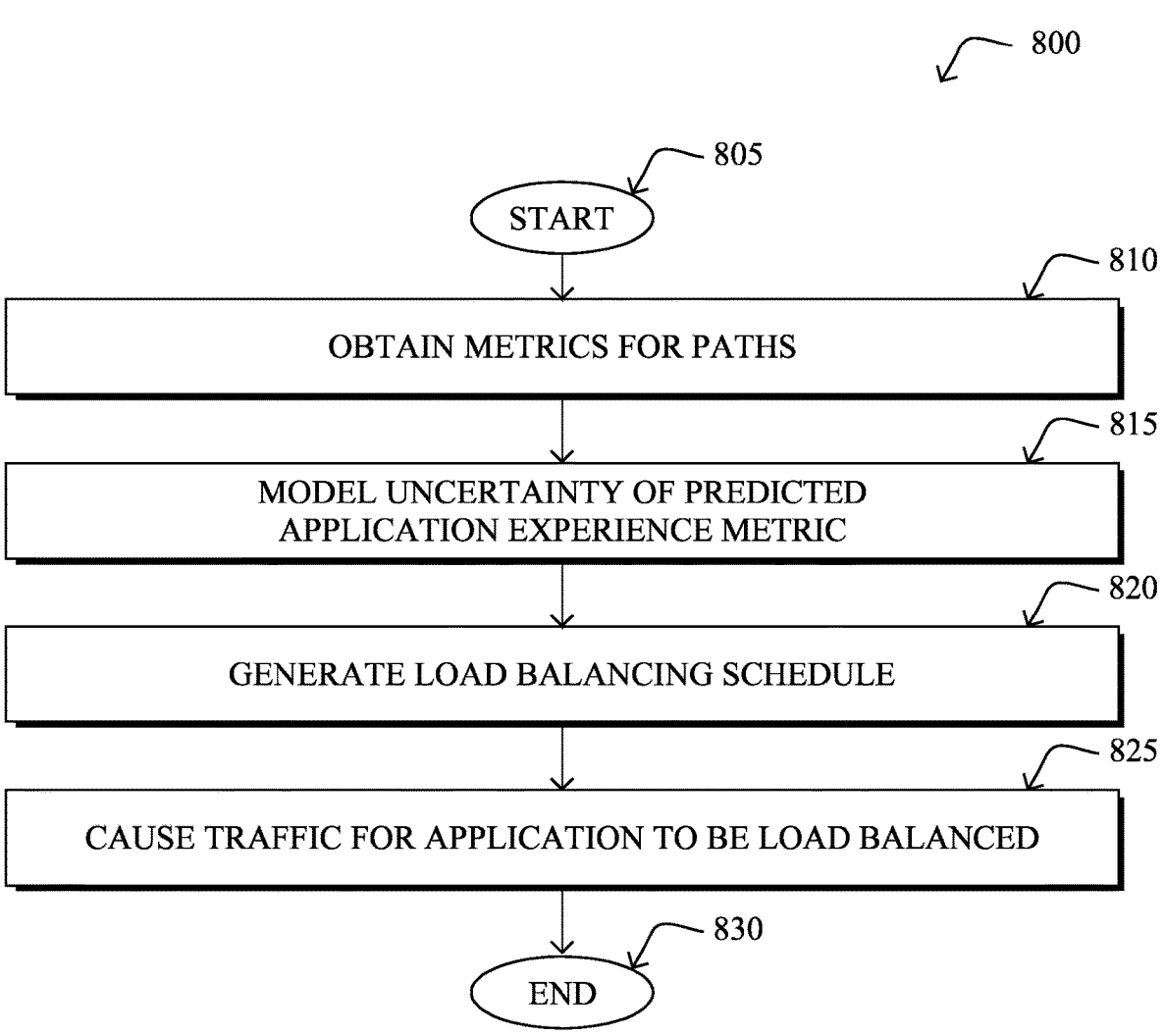
FIG. 8 illustrates an example simplified procedure for predictive application-aware load-balancing based on failure uncertainty.

FIG. 8 illustrates an example simplified procedure 800 (e.g., a method) for predictive application-aware load-balancing based on failure uncertainty, in accordance with one or more embodiments described herein. For example, a non-generic, specifically configured device (e.g., device 200), such as controller for a network (e.g., an SDN controller, a cloud-based device, etc.), an edge router, or other device in communication therewith, may perform procedure 800 by executing stored instructions (e.g., predictive routing process 248). The procedure 800 may start at step 805, and continues to step 810, where, as described in greater detail above, the device may obtain metrics for a plurality of network paths via which traffic for an online application may be conveyed. Such metrics may include, but are not limited to, any or all of the following: path-specific performance metrics (e.g., delay, loss, jitter, bandwidth usage, throughput, etc.), device-specific metrics for one or more devices associated with the path (e.g., aggregate throughput at an endpoint, etc.), application experience metrics (e.g., based on actual feedback from the online application, SLA templates, etc.), combinations thereof, or the like. The obtained metrics may also include application-specific metrics and/or aggregate metrics across multiple applications.

At step 815, as detailed above, the device may model, for each of the plurality of network paths, uncertainty of an application experience metric predicted for the online application across different values of one or more metrics for that path, based on its obtained metrics. In some embodiments, the application experience metric may comprise an SLA, such as a prediction as to whether or not an SLA will be violated by one or more metrics for the path having a certain value or set of values. In other embodiments, the application experience metric is based on feedback provided by users of the online application (e.g., user-provided satisfaction ratings, etc.). In various embodiments, the device may do so in part by determining, for a particular network path in the plurality of network paths, that the metrics obtained for that path do not include a certain value or range of values. In turn, the device may cause an experiment to be conducted along the particular network path, in order to obtain metrics for that certain value or range of values. In one embodiment, the experiment entails rerouting at least a portion of the traffic for the online application along the particular network path. In another embodiment, the experiment entails sending synthetic traffic along the particular network path. In some embodiments, the device generates the load balancing schedule based further in part on one or more rules specified via a user interface.

At step 820, the device may generate, based on the uncertainty of the application experience metric modeled for each of the plurality of network paths, a load balancing schedule for the plurality of network paths, as described in greater detail. In various embodiments, the device may do so in a manner so as to maximize the application experience metric for the online application across the plurality of network paths and with a minimal amount of uncertainty. In one embodiment, the device may also predict an amount of the traffic for the online application. In such cases, the load balancing schedule may be generated based further in part on the amount of the traffic for the online application predicted by the device. In a further embodiment, the load balancing schedule causes a session for the online application to be split among two or more of the plurality of network paths.

At step 825, as detailed above, the device causes traffic for the online application to be load balanced across the plurality of network paths in accordance with the load balancing schedule. In some embodiments, the device may also provide an alert indicative of congestion along one or more of the plurality of network paths, after causing the traffic for the online application to be load balanced in accordance with the load balancing schedule. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for predictive application-aware load-balancing based on failure uncertainty, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

accessing a datalake for a plurality of network paths via which traffic for an online application may be conveyed;

predicting, for each path of the plurality of network paths, based at least in part on the datalake, a probability of a service level agreement (SLA) violation of an application experience metric;

modeling, for the application experience metric at each of the plurality of network paths, uncertainty of the predicted probability of the SLA violation at multiple throughput values, where a lower number of samples in the datalake related to the application experience metric corresponds to a higher uncertainty value at a particular throughput value;

predicting an amount of the traffic for the online application;

generating, based at least in part on the uncertainty of the predicted probability of the SLA violation at the multiple throughput values for each of the plurality of network paths, and based at least in part on the predicting the amount of the traffic for the online application, a load balancing schedule for the online application on the plurality of network paths; and causing traffic for the online application to be load balanced across the plurality of network paths in accordance with the load balancing schedule.

2. The method as in claim 1, wherein the application experience metric comprises voice degradation.

3. The method as in claim 1, wherein the application experience metric is based on feedback provided by users of the online application.

4. The method as in claim 1, wherein the application experience metric is based on an SLA template.

5. The method as in claim 1, wherein modeling the uncertainty further comprises:

determining, for a particular network path in the plurality of network paths, that the datalake contains an insufficient number of the samples for a certain throughput value or for a range of throughput values; and causing an experiment to be conducted along the particular network path, in order to obtain sample data for the certain throughput value or the range of throughput values.

6. The method as in claim 5, wherein the experiment entails rerouting at least a portion of the traffic for the online application along the particular network path.

7. The method as in claim 5, wherein the experiment entails sending synthetic traffic along the particular network path.

8. The method as in claim 1, wherein the generating the load balancing schedule is based further in part on one or more rules specified via a user interface.

9. The method as in claim 1, wherein the load balancing schedule is generated based at least in part on balancing a lower probability of an SLA violation and a higher throughput while maintaining a low uncertainty.

10. The method as in claim 1, wherein the load balancing schedule causes a session for the online application to be split among two or more of the plurality of network paths.

11. An apparatus, comprising:

one or more network interfaces;

a processor coupled to the one or more network interfaces and configured to execute one or more processes; and a memory configured to store a process that is executable by the processor, the process when executed configured to:

access a datalake for a plurality of network paths via which traffic for an online application may be conveyed;

predict, for each path of the plurality of network paths, based at least in part on the datalake, a probability of a service level agreement (SLA) violation of an application experience metric;

model, for the application experience metric at each of the plurality of network paths, uncertainty of the predicted probability of the SLA violation at multiple throughput values, where a lower number of samples in the datalake related to the application experience metric corresponds to a higher uncertainty value at a particular throughput value;

predict an amount of the traffic for the online application;

generate, based at least in part on the uncertainty of the predicted probability of the SLA violation at the multiple throughput values for each of the plurality of network paths, and based at least in part on the predicting the amount of the traffic for the online application, a load balancing schedule for the online application on the plurality of network paths; and cause traffic for the online application to be load balanced across the plurality of network paths in accordance with the load balancing schedule.

12. The apparatus as in claim 11, wherein the application experience metric comprises voice degradation.

13. The apparatus as in claim 11, wherein the application experience metric is based on feedback provided by users of the online application.

14. The apparatus as in claim 11, wherein the application experience metric is based on an SLA template.

15. The apparatus as in claim 11, wherein the uncertainty is further modeled by the apparatus by:

determining, for a particular network path in the plurality of network paths, that the datalake contains an insufficient number of samples for a certain throughput value or for a range of throughput values; and causing an experiment to be conducted along the particular network path, in order to obtain sample data for the certain throughput value or the range of throughput values.

16. The apparatus as in claim 15, wherein the experiment entails rerouting at least a portion of the traffic for the online application along the particular network path.

17. The apparatus as in claim 15, wherein the experiment entails sending synthetic traffic along the particular network path.

18. The apparatus as in claim 11, wherein the apparatus generates the load balancing schedule based further in part on one or more rules specified via a user interface.

19. The apparatus as in claim 11, wherein the load balancing schedule is generated based at least in part on balancing a lower probability of the SLA violation and a higher throughput while maintaining a low uncertainty.

20. A tangible, non-transitory, computer-readable medium storing program instructions that cause a device to execute a process comprising:

accessing a datalake for a plurality of network paths via which traffic for an online application may be conveyed;

predicting, for each path of the plurality of network paths, based at least in part on the datalake, a probability of a service level agreement (SLA) violation of an application experience metric;

modeling, for the application experience metric at each of the plurality of network paths, uncertainty of the predicted probability of the SLA violation at multiple throughput values, where a lower number of samples in the datalake related to the application experience metric corresponds to a higher uncertainty value at a particular throughput value;

predicting an amount of the traffic for the online application;

generating, based at least in part on the uncertainty of the predicted probability of the SLA violation at the multiple throughput values for each of the plurality of network paths, and based at least in part on the predicting the amount of the traffic for the online application, a load balancing schedule for the online application on the plurality of network paths; and causing traffic for the online application to be load balanced across the plurality of network paths in accordance with the load balancing schedule.

\* \* \* \* \*